(12) United States Patent
Fehrenbach et al.

(10) Patent No.: US 6,677,891 B2
(45) Date of Patent: Jan. 13, 2004

(54) METHOD AND DEVICE FOR TRANSMITTING AND RECEIVING ELECTROMAGNETIC WAVES

(75) Inventors: Josef Fehrenbach, Haslach (DE); Karl Griessbaum, Muhlenbach (DE); Felix Raffalt, Hausach (DE)

(73) Assignee: VEGA Grieshaber KG (DE)

( * ) Notice: Subject to any disclaimer, the term of this patent is extended or adjusted under 35 U.S.C. 154(b) by 0 days.

(21) Appl. No.: 10/051,632

(22) Filed: Jan. 18, 2002

(65) Prior Publication Data

US 2002/0154052 A1 Oct. 24, 2002

Related U.S. Application Data
(60) Provisional application No. 60/265,029, filed on Jan. 31, 2001.

(30) Foreign Application Priority Data

Jan. 19, 2001 (DE) .......................... 101 02 439

(51) Int. Cl.⁷ .............................. G01S 13/08; G01S 7/28
(52) U.S. Cl. .................... 342/124; 342/175; 342/198
(58) Field of Search ........................ 342/124, 175, 342/198

(56) References Cited

U.S. PATENT DOCUMENTS

| | | | |
|---|---|---|---|
| 3,621,400 A | 11/1971 | Paciorek et al. ............. 325/446 |
| 3,935,970 A | 2/1976 | Spaw .......................... 222/56 |
| 4,254,482 A | * 3/1981 | Newman ..................... 367/87 |
| 4,392,523 A | 7/1983 | Beller et al. ................. 164/453 |
| 4,945,321 A | 7/1990 | Oppelt et al. ............... 333/119 |
| 5,070,730 A | * 12/1991 | Edvardsson ............... 73/290 V |
| 5,233,352 A | * 8/1993 | Courname .................. 342/124 |
| 5,279,156 A | 1/1994 | van der Pol ................ 73/290 |
| 5,365,178 A | 11/1994 | Van Der Pol .............. 324/644 |
| 5,517,198 A | 5/1996 | McEwan ..................... 342/89 |
| 5,609,059 A | 3/1997 | McEwan ..................... 73/290 |

(List continued on next page.)

FOREIGN PATENT DOCUMENTS

| | | | |
|---|---|---|---|
| EP | 4240491 | 6/1994 | ............ G01S/7/40 |
| EP | 4240492 | 6/1994 | ........... G01S/7/292 |
| EP | 0882955 | 12/1998 | ......... G01F/22/284 |
| EP | 1039572 | 9/2000 | ............. H01P/1/08 |

OTHER PUBLICATIONS

"High sensitivity inductive sensing system for position measurement", Dong–June Choi; Chun–Taek Rim; Soohyun Kim; Yoon Keun Kwak; Instrumentation and Measurement Technology Conference, 2000. IMTC 2000.Procs. of the 17th IEEE, vol. 2, 2000 pp. 595–599.*

"Siemens Matsushita Components", *Data Book*, (1997),pp. 58–59.

Maas, S., *Microwave Mixers*, Artech House, ISBN 0–89006–171–8,(1986),6 pages.

Voges, E., *Hochfrequenztechnik, Band 1*, Huthig–Verlag, Heidelberg,(1986),pp. 264–265.

*Primary Examiner*—John B. Sotomayor
(74) *Attorney, Agent, or Firm*—Schwegman, Lundberg, Woessner & Kluth, P.A.

(57) ABSTRACT

The invention relates to a filling level measuring device based on the principle of transit time measurement. An inventive filling level measuring device comprises an electronic unit (4) including a transmitting (9) and receiving means (10) for electromagnetic waves having a frequency of below 3 GHz, a process coupling means (5) connected to the electronic unit (4), which guides the transmitted signals onto the measurement distance, and guides back reflected signals to the electronic unit (4), and a high-frequency transformer (15, 16, 17, 18), to which the transmitting (9) and receiving means (10) and the process coupling means (5) are connected.

56 Claims, 6 Drawing Sheets

U.S. PATENT DOCUMENTS

| | | | |
|---|---|---|---|
| 5,614,911 A | 3/1997 | Otto et al. | 342/124 |
| 5,659,321 A | 8/1997 | Burger et al. | 342/124 |
| 5,689,265 A | 11/1997 | Otto et al. | 342/124 |
| 5,947,372 A * | 9/1999 | Tiernan | 236/94 |
| 6,014,100 A | 1/2000 | Fehrenbach et al. | 342/124 |
| 6,320,532 B1 * | 11/2001 | Diede | 342/124 |
| 6,469,599 B1 | 10/2002 | Otto et al. | 333/254 |
| 6,474,158 B2 * | 11/2002 | Czarnek | 73/313 |
| 6,499,346 B1 | 12/2002 | Wien et al. | 73/290 |
| 6,535,161 B1 * | 3/2003 | McEwan | 342/124 |
| 6,597,309 B1 * | 7/2003 | Panton et al. | 342/134 |
| 2002/0154052 A1 * | 10/2002 | Fehrenbach et al. | 342/124 |

\* cited by examiner

METHOD AND DEVICE FOR TRANSMITTING AND RECEIVING ELECTROMAGNETIC WAVES

This application claims benefit of provisional application No. 60/265,239 filed Jan. 31, 2001 now abandoned.

BACKGROUND OF THE INVENTION

The invention relates to a filling level measuring device working on the principle of the transit time measurement of electromagnetic waves in the frequency range of below 3 GHz, in particular of below 2.5 GHz.

For the filling level measurement, measurement systems are used, which determine the distance between sensor and filling products on the basis of the measured transit time of electromagnetic waves from a sensor—in general also designated as filling level measuring device—mounted in a receptacle cover, to the surface of the filling products and back. With knowledge of the receptacle height, the required filling level can then be calculated. Such filling level measurement devices, also known under the technical term filling level radar, are all based on the property of electromagnetic waves of propagating within a homogenous, non-conductive material at a constant speed and of being reflected at least in part at the boundary surface of different media. Each boundary surface of two media having different dielectric constants generates a radar echo upon impingement of a wave. The larger the difference between the two dielectric constants, the more the wave resistance of the wave propagation alters, and the greater is the echo to be observed.

For determining the required wave transit time, various radar principles are known. The two principally used methods are, for one, the pulse transit time method (pulse radar), and, for another, the frequency-modulated continuous wave method (FMCW radar). The pulse radar uses the pulse-shaped amplitude modulation of the wave to be radiated, and determines the direct time interval between transmission and reception of the pulses. The FMCW radar determines the transit time in an indirect way by emitting a frequency-modulated signal and the differentiation between the emitted and the received instantaneous frequency.

Apart from the different radar principles, different frequency ranges of the electromagnetic waves are also used, depending on the application. Thus, pulse radars exist, for example, having carrier frequencies comprised between 5 and 30 GHz, and there exist others working in the base band as so-called monopulse radars without carrier frequency.

Moreover, a series of methods and devices are known guiding the electromagnetic wave to the filling product surface and back. Thereby, the basic difference is made between a wave radiated into the space, and a wave guided through a line. With waves radiated into the space, a differentiation into so-called bistatic arrangements and so-called monostatic arrangements is possible.

Bistatic arrangements have two separate antennas, one of these serving for emitting and the other for receiving. In monostatic arrangements, a single antenna serves at the same time for sending and receiving.

Sensors with guided electromagnetic waves working on the reflection principle, normally are always configured monostatic. An advantage of a monostatic sensor realization results in saving a second antenna or waveguide terminal, and therewith in a simple, space-saving structure. A disadvantage arises by the circuit-technical necessity of connecting the transmitter circuit, as well as the receiver circuit—these are also designated as transmitting and receiving means—with an antenna or a waveguide terminal connected upstream thereof. Thereby, the problem arises of mutually isolating the transmitter and receiver despite the common connection to the antenna and the waveguide terminal. Isolation means in this case the prevention of a signal change-over from the one circuit part to the other. Without this isolation, the transmitted signal would reach the receiver in the direct way, and would generate a comparatively large reception signal due to its relatively high amplitude.

Compared to the intended reception signals, which result from reflections on the measurement distance, and which are of a more or less high attenuation due to the transmission distance and the reflection at the measurement object, the transmitted signal, that reaches the receiver without isolation, causes a reception amplitude which is higher by a multiple. Despite the fact that this transmitted signal registered in the receiver arrives earlier from the measurement object than the echo to be evaluated, and that it is therewith not directly interfered with useful echoes, serious problems can arise due to the lacking isolation complicating or even preventing a distance measurement. Under these circumstances, the amplitude dynamics of the receiver must be adapted to a much higher range. In case the receiver cannot process the high amplitude of the transmitted signal, and even a limiting effect occurs, such an effect can remain effective for some time, until the time interval in which the useful echoes have to be expected. As a consequence thereof, the useful echoes would not be correctly receivable, and the measurement result would be questioned. In addition, it has to be expected that the impedance matching of the receiver is not ideal. A minor portion of each incoming echo signal is again reflected at the receiver input, and usually arrives at the receiver after a further reflection within the circuit, a second or third, etc., time. This phenomenon which can be characterized as ringing, plays no role in usual echo signals originating from reflections within the measurement distance. With a lacking isolation between transmitter and receiver, however, these signals of the transmitted signal, which have been reflected several times, are still in the order of useful echo amplitudes despite a corresponding attenuation. Due to their temporal position following the transmitted signal, they are interfered with reflections of measurement objects placed closed to the sensor. This leads to measurement errors in the proximity of the measurement device.

For interconnecting the sender, receiver and antenna or waveguide terminal, the following solutions are known. In the document DE 42 40 492, the use of a directional coupler or circulator is proposed. As to the practical circuit configuration of such a circuit part, no indications can be found therein. But it is described how a reception mixer can likewise be realized with directional couplers in such a way that the receptions signal and the local oscillator signal are mutually isolated. The directional couplers in this publication are realized as so-called hybriding couplers in microstrip technology. Similar directional coupler solutions can also be found in the U.S. Pat. No. 3,621,400.

The microstrip technology, however, is only applicable in a reasonable manner for signal frequencies in the microwave range (3–30 GHz). Usual radar sensors, however, use not only carrier frequencies, as has already been mentioned, e.g. in the range between 5 and 30 GHz, but there are also monopulse radars, which emit short pulses without using carrier frequencies. The frequency range of these transmitted signals typically is in the range of some Megahertz up to a few Gigahertz. Therewith, a directional coupler realization in microstrip technology is out of question for such monopulse radars.

In the document U.S. Pat. No. 5,517,198, a possibility is described, how in such a pulse radar—often also designated as TDR (time domain reflectometry)—a wide band isolation can be achieved between the transmitter and the receiver. The solution described therein uses a resistor bridge for dividing the transmitted signal into two identical portions. The one portion is directly fed into a branch of the receiver, the other one arrives in a second branch of the receiver, as well as in the measurement distance. Reflections from the measurement distance preponderantly arrive only in the second reception branch. By a differentiation between the two reception branches, the transmitted signal is eliminated from the receiver, while the reflections from the measurement distance remain uninfluenced. This solution is relatively extensive, since two reception branches are provided, and high amplitude attenuations of the useful echo are generated by the signal distribution over resistors.

In the document U.S. Pat. No. 5,609,059, another transmitting and receiving unit of the TDR filling level measuring device is described, by means of which undesired effects are reduced in the reception of a reflected electromagnetic signal. The function principle resides in a measurement of a difference of the transit time of an artificial reflection signal generated intentionally and the signal reflected at the filling product surface. The artificial reflection signal is generated by a resistor matched up to the impedance of the transmission cable and which is connected in parallel to the transmission cable. The signals reflected at the filling product surface are received and evaluated within a time window, which is pulsed by a control unit.

Another method for suppressing undesired interference phenomena in the signal response is described in the U.S. Pat. No. 5,365,178. Here, the signals reflected from the filling product surface are fed to a mixer and are compared with the frequency-modulated signals emitted by the transmitting unit, resulting in a frequency difference depending on the filling level. In this differential signal, undesired interfering frequencies are contained arising by the reflection of the signals at the inner receptacle side or in the transmitting and receiving unit itself. These undesired signals are without the frequency range of the desired signals and are eliminated by means of a band pass filter.

BRIEF SUMMARY OF THE INVENTION

The technical problem on which the invention is based resides in providing a monostatically structured filling level measuring device, in particular a base band radar or TDR filling level measuring device, allowing a simple, cost-efficient combination of transmitter, receiver and antenna or waveguide terminal, guaranteeing a high degree of isolation between transmitter and receiver. This combination of transmitter, receiver and antenna or waveguide terminal should moreover be of such a wide band configuration that it transmits, such as it is for example necessary with the monopulse radar, a frequency band of between some Megahertz and a few Gigahertz. The amplitude attenuation of the transmitted/received signals thereby should be as low as possible.

The invention is further based on the technical problem of proposing a simple and cost-efficient method for transmitting and receiving electromagnetic waves having a frequency of below 3 GHz, via a single antenna means.

These technical problems are solved by means of a filling level measuring device having the features of claim 1, and by a method having the features of claim 20, respectively.

An inventive filling level measuring device, which is based on the principle of transit time measurement, comprises an electronic unit with a transmitting and receiving means for electromagnetic waves having a frequency of below 3 GHz, a coupling means connected to said electronic unit which guides the transmitted signals onto the measurement distance and guides reflected signals back to the electronic unit, and a high-frequency transformer to which the transmitting and receiving means and the coupling means are connected.

An inventive method is characterized in that transmitted signals of a transmitting means are guided into the antenna means via a high-frequency transformer, and the reflected signals received by the antenna means, are guided to a receiving means via the same high-frequency transformer.

Through the first-time use of a high-frequency transformer functioning in a wide band manner in the frequency range of up to about 3 GHz, in particular of up to about 2.5 GHz, as a directional coupler by means of a corresponding geometry of the turns and wiring, and allowing a defined isolation between determined circuit components for transmission and reception connected thereto, an extremely cost-efficient, as well as effective solution is provided. It has finally to be noted, that here, under an antenna means, one or more waveguides have, for example, to be understood such as they are known in prior art for guiding the electromagnetic waves and the signals reflected from the filling products.

An important advantage of the inventive solution resides in that a good matching of the impedances of the individual components, in particular of the input impedance for the signals reflected from the measurement distance is possible. With a mismatching, the signals would be reflected several times, and additional interfering echoes would arise.

The determination of the ratios of the turns enables any desired impedance transformations, so that the impedance matching between individual circuit components can be optimized. So-called double hole transformers in SMD technology have turned out to be particularly suited. By a corresponding ferrite material and a corresponding winding of the double hole core, these transformers transform frequencies of up to 3 GHz, in particular of up to 2.5 GHz.

For these transformers, there exist two basically different winding arrangements, which can be used in different ways for the solution of the above-mentioned technical problem. The one group is here categorized under the term differential transformers, the other group of transformers is designated as transformers-directional couplers according to their purpose of use. Both types are known, in principle. Whereas differential transformers usually are used in frequency mixers and as baluns, transformers-directional couplers are mostly used in the distribution of satellite TV reception signals. In this application, a certain portion is decoupled via the directional coupler from a transmission cable for the connection of a receiver, whereas the preponderant signal portion is further guided on the main line.

In certain cases, it has turned out to be advantageous when the isolation between the transmitting and the receiving means is not completely ideal, rather allowing itself to be definably reduced. This is of importance there, where a sensor uses as a distance reference label that part of the transmitted signal reaching the receiver directly, due to an isolation which is not entirely perfect. A sensor working in this way is, for example, described in DE 42 40 491.

Preferably, the high-frequency transformer is a differential transformer featuring windings magnetically coupled with each other, two of which being connected to each other. This simple construction is cost-efficient and very purposeful for the adjustment of the respective impedances. In that all of the three windings feature the same number of turns, the adjustment of the impedances of the components connected to the differential transformer can be realized at all gates until the ideal impedance matching is reached. Thereby, the received echo signal is not subjected to additional reflections, and can therewith not cause any distortion of the measurement result. With this construction, it is also possible without any problems to carry out an impedance matching, so that a complete isolation is not given between the gate to which the transmitted signal is applied, and the gate from which the reception signal is emitted. In an advantageous manner, this signal portion immediately further transmitted from the transmitter to the receiver can, as has been outlined before, be used as a distance reference label.

Another preferred embodiment resides in that the differential transformer comprises two windings featuring the same number of turns, the third winding, however, comprising a turn number different therefrom, in particular comprising twice as many turns as one of the two first mentioned windings. Thereby, the impedance of the receiver means necessary for polydirectional matching is four times as high as with the turn ratios of the embodiment discussed before. The higher receiver impedance is often advantageous, since receiver means in many cases can be realized more easily at higher resistance than at lower resistance. With the receiver impedance being given, an optimum impedance matching can be allowed for by a matching of the turn ratios of the differential transformer. Depending on the given facts, however, it is also possible to provide other winding ratios.

It general, it can be stated that through the use of a high-frequency transformer, a low-resistance discharge of a static charge present on the waveguide is possible, which occurs in particular, e.g. when the filling product is granular plastic material. Through friction of the filling product at the waveguide during the filling or emptying process, same can become statically charged. The very high voltages arising thereby, can destroy the electronic circuitry connected to the waveguide when they are not connected to ground via the receptacle mass. This destruction is prevented through the simple low-resistance connection between the waveguide or the process coupling and the receptacle mass.

With the use of a transformer-directional coupler as the high-frequency transformer, in contrast to the differential transformer, ensues not a uniform but always a non-uniform signal division. Thereby ensues a greater signal attenuation than with the differential transformer, but it is advantageous that in the event of reception, mainly the receiver impedance has to be modified for the reflection-free signal matching. The appropriate impedance matching of the transmitter probably is more difficult.

Finally, it has to be emphasized that ring-shaped cores wound with three filaments can also be used in the sense of the present invention. Here, the wide band nature results from the specific kind of winding enabling a capacitive line coupling between the turn wires at high frequencies.

BRIEF DESCRIPTION OF THR DRAWINGS

For the better understanding and for the further explanation, several advantageous embodiments of the invention will be described in the following with reference to the attached drawings. Therein shows.

DESCRIPTION OF PREFERRED EMBODIMENTS OF THE INVENTION

Figure 1:
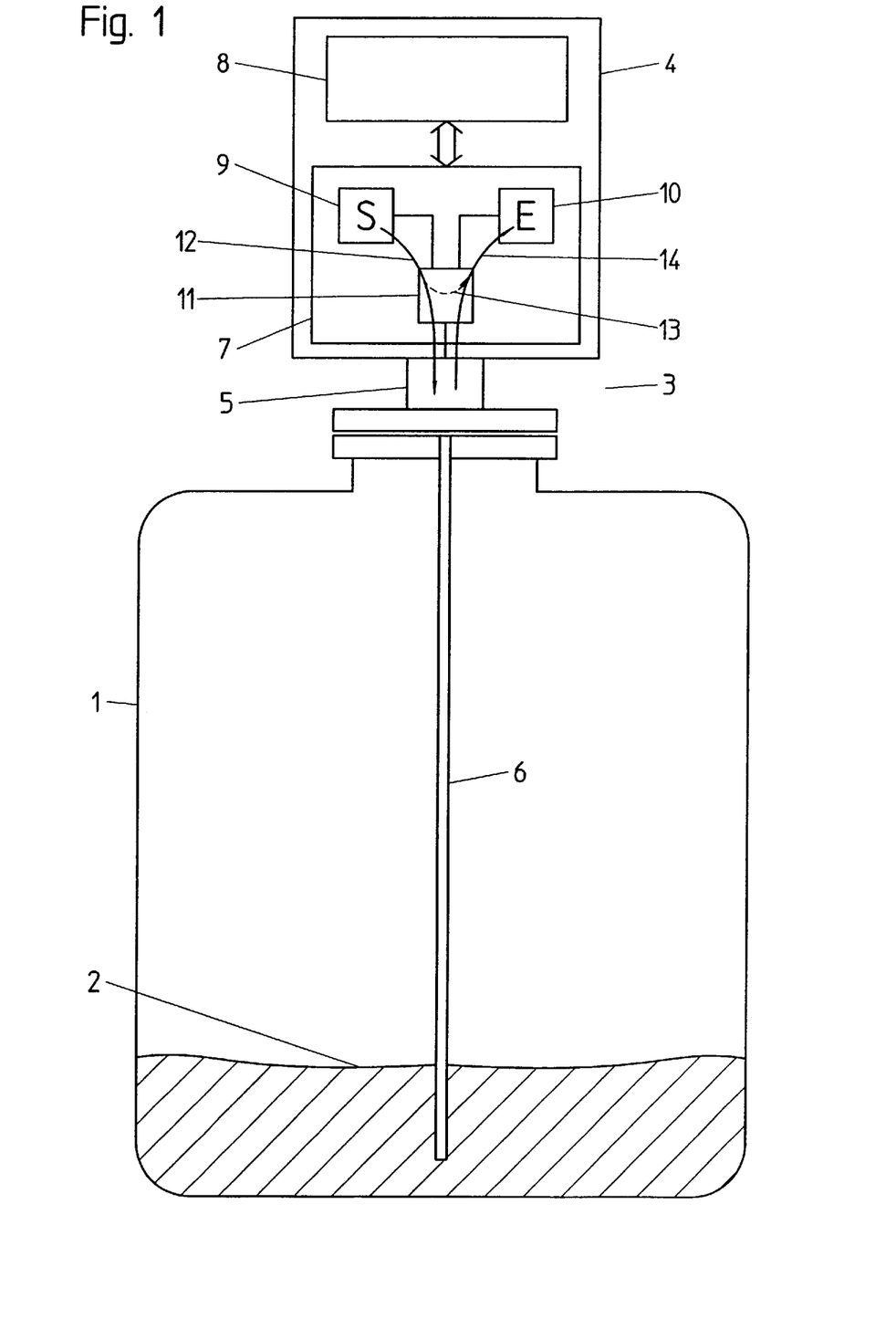
FIG. 1 a block diagram of an inventive radar-filling level measuring device.

In FIG. 1, a typical receptacle 1 is represented with a filling product 2. The filling level measuring device 3 is, for example, mounted on the top of an opening of receptacle 1, and determines the filling level of receptacle 1 according to the reflectometry principle for determining the signal transit time between an electronic unit 4 and a filling product 2 (approach and return path). The measurement signals generated in the electronic unit 4 are fed into the monitored measurement distance within the receptacle via a so-called process coupling 5. Under the term process coupling in general, the transition of the measurement signal from electronic unit 4 and a line possibly connected thereto, e.g. a coaxial cable, to the measurement distance, and therewith a transformation into an either guided or freely radiating electromagnetic waveguide has to be understood. With freely radiating radar sensors, antennas are used for this purpose.

In the case of the exemplary sensor shown in FIG. 1 with a waveguide 6 for guiding the wave, the process coupling 5 comprises the mechanically and electrically suitable coupling of the signal from the electronic unit to waveguide 6, which is, for example, a so-called single-wire line.

Electronic unit 4 includes a front end electronic unit 7 and further electronic components 8, such as, for example, a power supply, a signal processing circuit, an echo evaluation circuit, and I/O circuits and a communication unit, respectively. The functions of these electronic units are well known, for which reason they will not be dealt with in detail here.

The front end electronic unit 7 includes a transmitting means or transmitter circuit 9 generating the measurement signals, a receiving means or receiver circuit 10 receiving the signals reflected along the measurement distance, and a circuit part 11 for interconnecting the transmitter 9, receiver 10 and process coupling 5.

According to the invention, the circuit part 11 has the effect that the transmitted signals, the propagation direction of same being shown by the arrow 12, do not add or only to a minor, defined degree, via the signal path 13 illustrated in broken lines, to the reception signals, the propagation direction of same being shown by the arrow 14.

Figure 2:
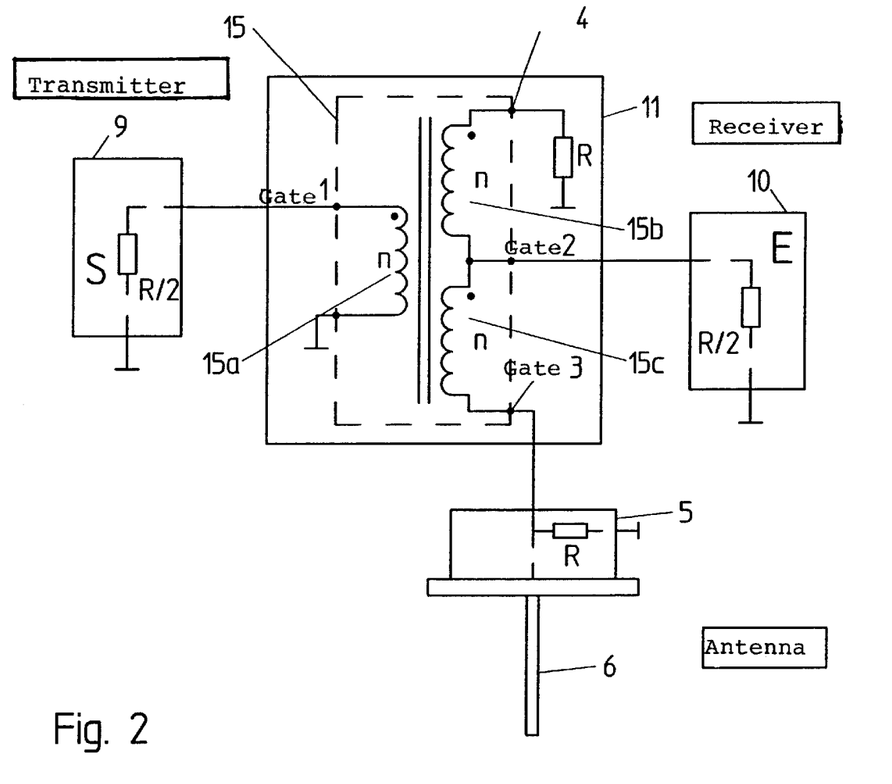
FIG. 2 a first inventive circuit realization using a differential transformer.

In FIG. 2 it is illustrated how the circuit part 11 can be configured in a manner according to the invention so as to have the required isolation effect between transmitter 9 and receiver 10. Through a corresponding wiring of a differential transformer 15, this isolation is solved in a very simple and cost-efficient manner. Differential transformer 15 has three windings 15a, 15b and 15c, which are magnetically coupled with each other by means of a common ferrite core. This ferrite core, which is shown only indirectly in the circuit diagram by the outlined magnetic coupling, must be appropriate for very high frequencies, e.g. of up to 2.5 GHz, depending in each case on the frequency range of the used signals.

The three windings of the exemplary transformer of FIG. 2 are each comprised of n turns, the turn number n in turn depending on the frequency range to be transformed and the ferrite core. Usually, 1 to 10 turns are already sufficient for the described application.

The transmitted signal fed by transmitter 9 to a gate 1, for symmetry reason, appears only at gates 3 and 4, but not at a gate 2, to which the receiver 10 is connected. The signals at gate 3 and gate 4 have the same amplitudes but are antiphase to each other. The process coupling 5 in this example is connected to gate 3, and gate is closed with a resistor R. The signals reflected from the measurement distance and arriving at gate 3 are uniformly distributed to gates 1 and 2m whereas gate 4 is isolated in this case. With appropriate impedances of the components connected to differential transformer 15, an ideal impedance matching prevails at all gates. This condition provides for received echo signals not being subjected to further reflections and for not causing distortions of the measurement result as so-called multireflections.

In FIG. 2, the impedances of the four components connected to the differential transformer are shown, which are necessary for a polydirectional matching: At gates 1 and 2, identical impedances (R/2) must be present, the value of which is half as big as the value of the same impedances (R) at gates 3 and 4.

Figure 3:
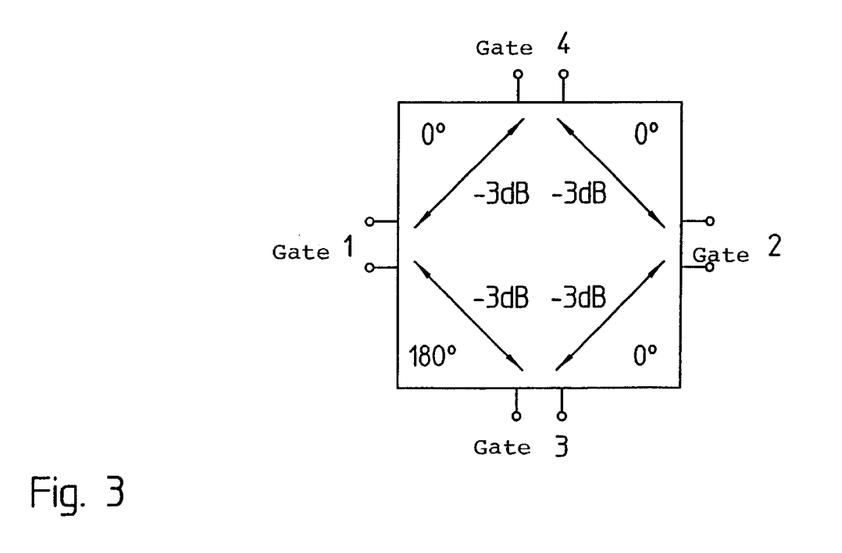
FIG. 3 a four-gate equivalent diagram of the circuit of FIG. 2.

FIG. 3 shows the signal flow of differential transformer 15 from FIG. 2 in a simplified four-gate representation. The designation of the gates corresponds here to the designation in FIG. 2. It is illustrated that, as to its power, a signal arriving at gate 1, is evenly distributed to the gates 3 and 4. The division of the power into two equal parts is marked by the term "−3 dB". The signals of gate 1 and gate 4 are equiphase, whereas the signal at gate 3 seems to be antiphase ("180°") thereto. It can be rapidly derived from FIG. 3 how the distribution to two neighboring gates relative to amplitude and phase takes place, when a signal is fed in at an arbitrary gate. The gate opposite the feeding gate, in the ideal case is always completely isolated. A prerequisite for this is, however, as has already been outlined, that the impedances shown in FIG. 2 are present at all gates. It can further be recognized that for transmitted, reflected and back-received signals, alone through the behavior of the differential transformer, a power attenuation of 6 dB arises. By a slight impedance change, e.g. of the absorbing impedance R at gate 4 of FIG. 2, the isolation between gate 1 and gate 2, which is complete in the ideal case, can be reduced in a defined manner. Thereby, a minor part of the transmitted signal of gate 1 is directly coupled to the receiver at gate 2. This signal portion can be advantageously used as the distance reference label.

As can easily be inferred from FIG. 3, other circuit combinations than those shown in FIG. 2, are likewise possible. Basically, all possibilities are suitable, wherein transmitter 9 and receiver 10 are connected to opposite gates. Depending on the wiring, it can be selected whether or not an additional phase shift of 180° arises within the transmitting-receiving path.

Figure 4:
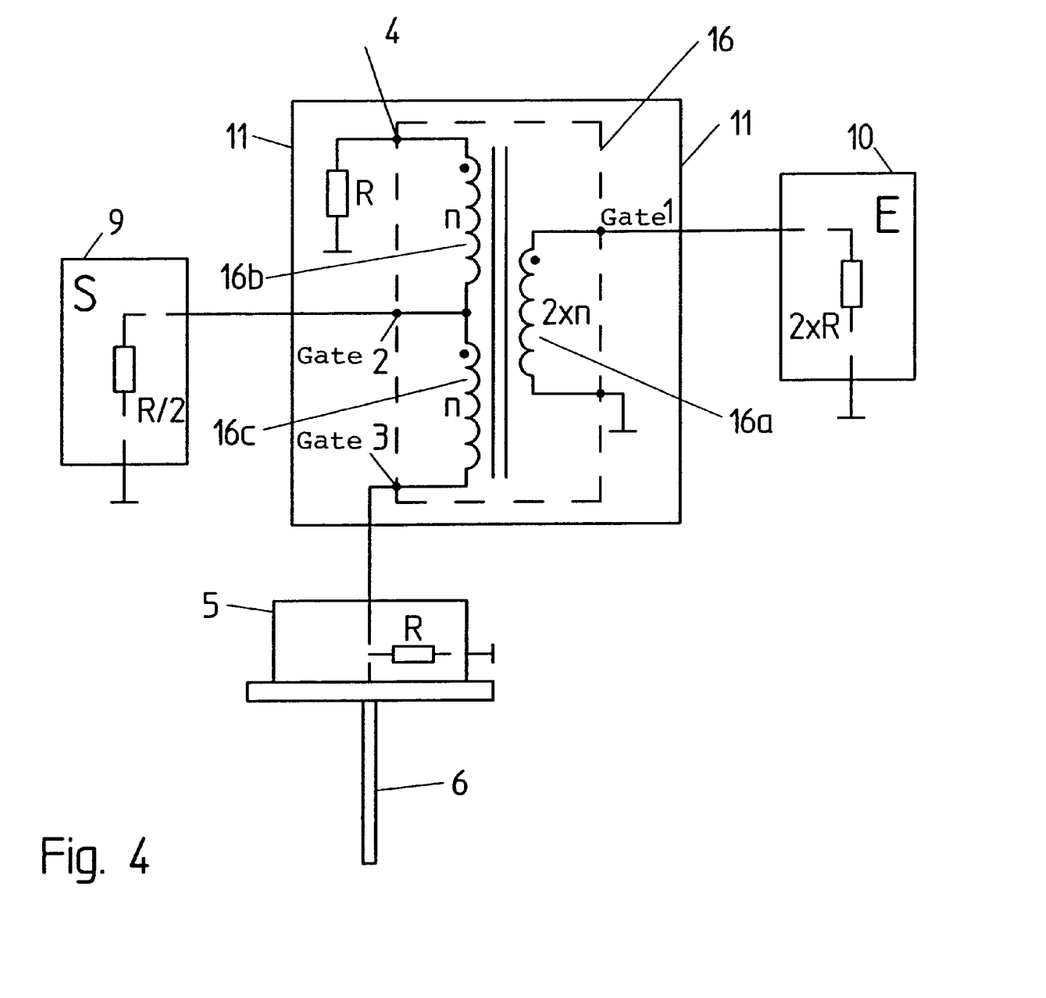
FIG. 4 a variant of the circuit of FIG. 2 with an increased receiver impedance.

One of these alternative circuit possibilities is shown in FIG. 4. Transmitter 9 here is connected to gate 2, receiver 10 to gate 1. Process coupling 5 and measurement distance, respectively, are connected to gate 3 as in FIG. 2. In the differential transformer 16 used here, the turn numbers are not all identical, winding 16a rather has twice as many turns as windings 16b or 16c. Caused thereby, the impedance of receiver 10 necessary for the polydirectional matching, is four times as high as with the turn ratios of FIG. 2. The higher receiver impedance is often advantageous, since in many cases receivers can more easily be realized of high resistance than of low resistance. With a given receiver impedance, an optimum impedance matching can be provided for by matching the winding ratios of the differential transformer.

Figure 5:
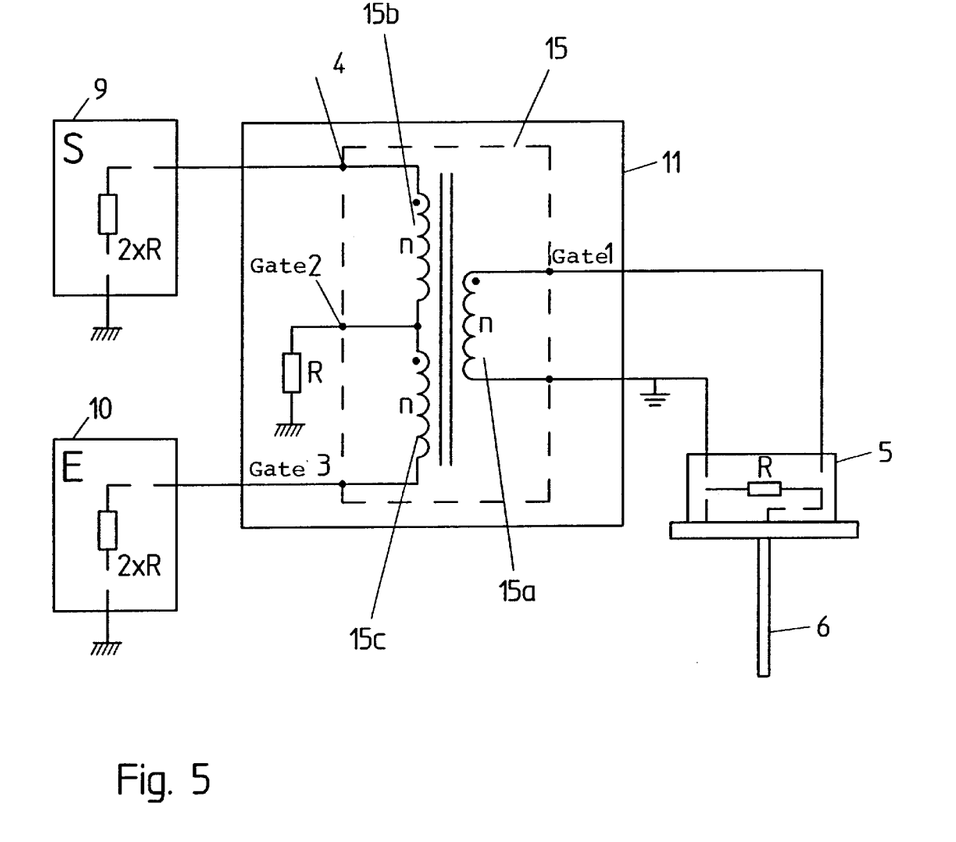
FIG. 5 a further variant of the circuit of FIG. 2 with a potential-separated measurement distance, FIG. 6 a circuit diagram of a transformer-directional coupler, FIG. 7 the four-gate equivalent diagram of the transformer-directional coupler of FIG. 6, and FIG. 8 a further inventive circuit realization using a transformer-directional coupler.

A further advantageous variant with a differential transformer is shown in FIG. 5. Transmitter 9 and receiver 10 oppose each other at gates 3 and 4, while process coupling 5 is connected to gate 1. Therewith, a galvanic potential separation between the electronic unit of the sensor, for one, and the process coupling and hence the receptacle potential, for another, is possible. Such galvanic potential separations usually are desired within most sensors so as to avoid potential equalization currents between the receptacle and the central control via the sensor.

A further advantage applying more or less to all solutions wherein process coupling 5 is connected to a transformer, and which can be seen from FIG. 5 in a particularly clear manner, is the low-resistance derivation of static charge on the waveguide. This problem arises, for example, when granular plastic material is the filling product. Through friction of the filling product at the waveguide during the filling or emptying process, same can become statically charged. The very high voltages arising thereby, can destroy the electronic circuitry 7 connected to the waveguide when they are not connected to ground via the receptacle mass.

From FIG. 5 it becomes clear that winding 15a provides for the low-resistance connection between waveguide 6 and process coupling 5 and receptacle mass, respectively. Therewith, the problem of static charge or discharge is solved in a simple manner.

Figure 6:
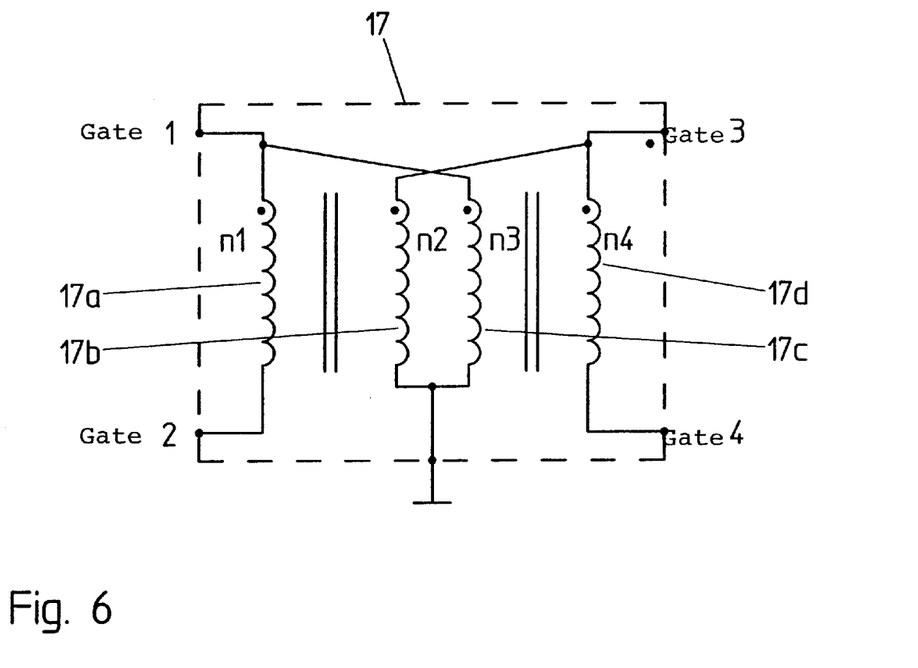
Figure 7:
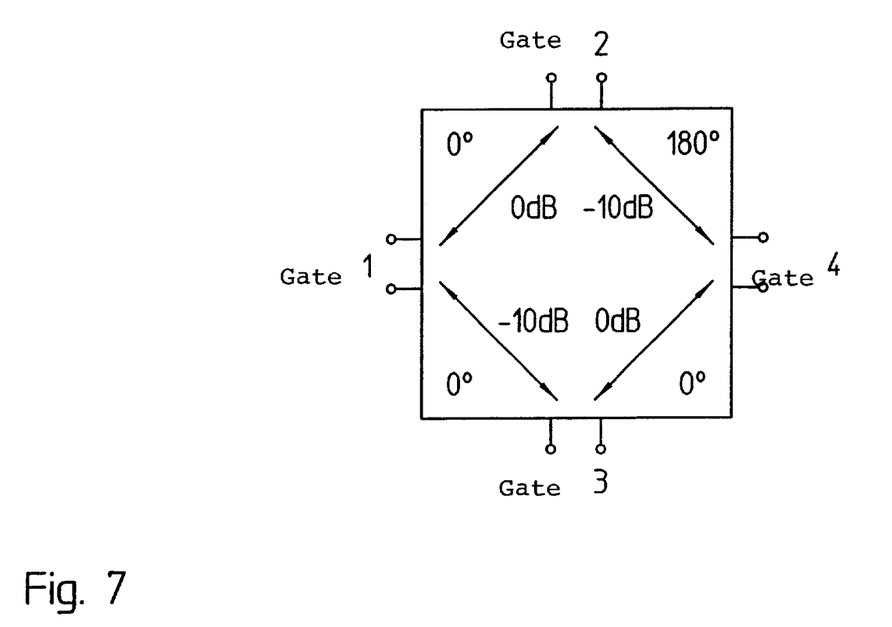

Another group of transformers is represented by the transformer diagram of FIG. 6. These so called transformers-directional couplers have likewise to be considered as being a four-gate and have four windings 17a, 17b, 17c and 17d with mostly different turn numbers n1, n2, n3 and n4 on the same double hole core. The windings 17a and 17b are wound on a common leg of the core, whereas the windings 17c and 17d rest on the other leg. This transformer scheme leads to a signal division of signals fed in, as it is shown in FIG. 7 for a determined exemplary division of the turn numbers. Each signal fed in at an arbitrary gate is distributed to the two neighboring gates. The opposite gate is always isolated. In contrast to the differential transformer, the signal distribution is not uniform but always non-uniform. While the signal, when it is fed in at gate 1, runs to gate 2 almost without being attenuated, a portion e.g. only attenuated by 10 dB arrives at gate 3. With the indication of the attenuation values, the value "0 dB" has to be considered a rounding, since when an even small portion runs to gate 3, the portion running to gate 2 must also be somewhat smaller than the infed signal. For simplifying the observation, these rounded attenuation values can all the same be referred to. Between gate 2 and gate 4, a phase angle rotation of 180° takes place, which, depending on the wiring of the transformer, can be integrated into the installed front end conception, or is dispensed of.

For the connection of transmitter, receiver and process coupling to the four-gate of the transformer-directional coupler, 8 variants ensue in toto, all of them satisfying the condition of the transmitter and receiver being connected to opposing gates, hence to gates, which are decoupled from each other. The selection of one of these variants depends on whether which circuit scheme, in conjunction with actual impedances or impedances to be realized of the connected circuit parts, avoids best multireflections in the receiver, and whether a phase angle rotation of 180° is desired between the transmitted and received signal.

Figure 8:
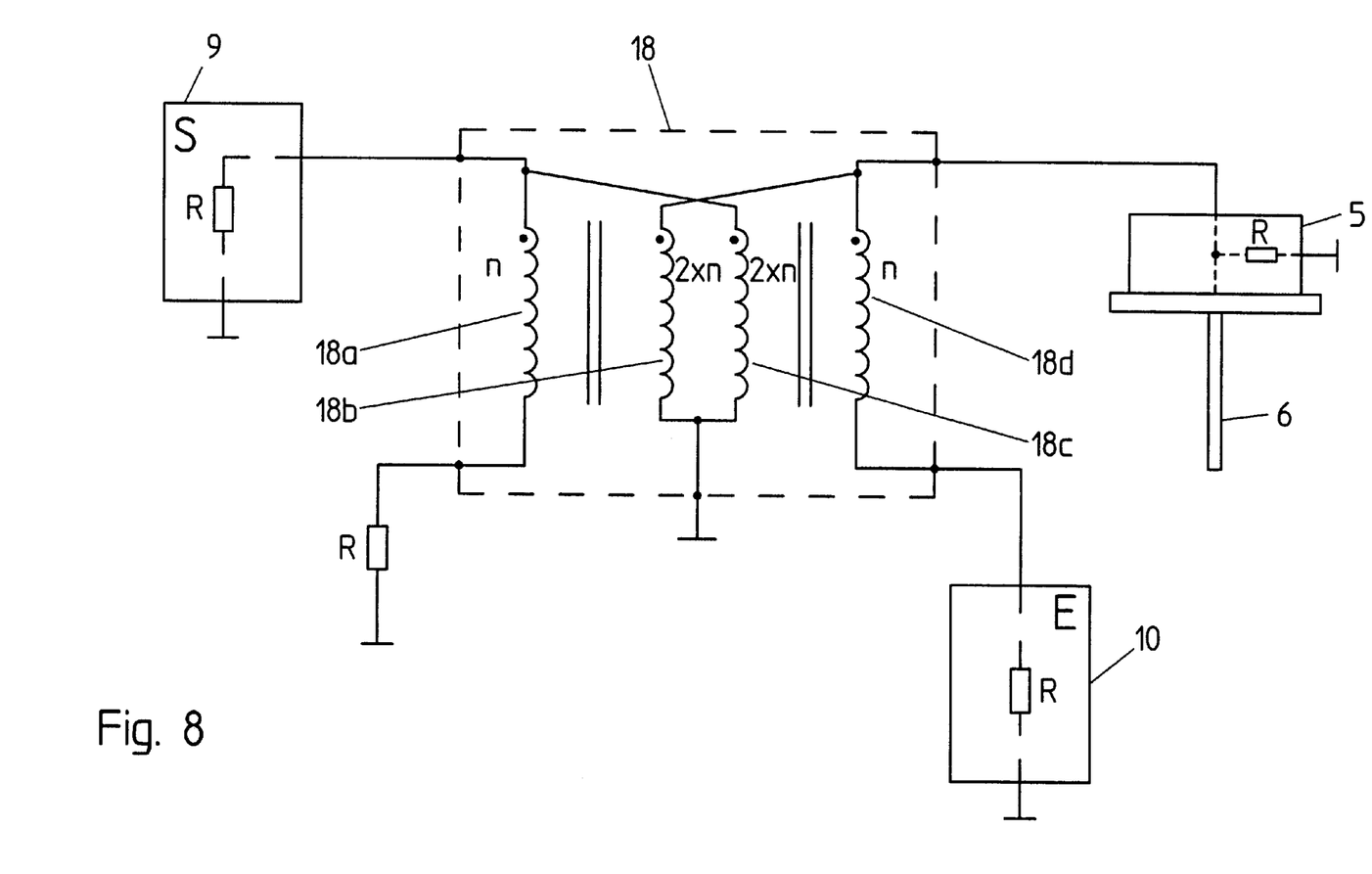

An example of such an inventive wiring of the transformer-directional coupler from FIG. 6 is shown in FIG. 8. Transmitter 9 is now connected to gate 1, receiver 10 to gate 4, and process coupling 5 to gate 3. Gate 2 is closed in a reflection-free manner by means of resistor R. The turn numbers are identical for the windings 18a and 18b, whereas the windings 18b and 18c have twice as many turns. By closing all gates having the same impedance R, a polydirectional matching is given, so-that multireflections cannot arise. A signal delivered to gate 1 from the transmitter, is absorbed in resistor R at gate 4 in its larger part, while a portion, e.g. attenuated by 10 dB, runs further from gate 3 to process coupling 5 and waveguide 6. Reflected signals arrive at gate 3 and reach the receiver connected to gate 4 mostly unattenuated. A small portion of the reflected signal is also guided to gate 1 where it is absorbed in the impedance-matched transmitter.

The signal attenuation by using the transformer-directional coupler 18 amounts to at least 10 dB in the example shown. This attenuation, it is true, is higher than with the use of a differential transformer, but here it is advantageous that in the reception event of signals arriving at gate 3, only the receiver impedance at gate 4 is principally decisive for the reflection-free signal matching. This matching can mostly be realized at the receiver by appropriate measures, whereas the appropriate impedance matching of the transmitter probably is more difficult. This, however, advantageously plays a minor role in this circuit.

Exactly as with the differential transformer, here as well, by means of a slight impedance detuning, e.g. at the resistor R at gate 2, a minor overcoupling of the transmitted signal of gate 1 to the receiver at gate 4 can definably be adjusted. This cross-talk signal is useful as a distance reference label, as has already been described.

The coupling attenuation which is indicated with 10 dB in the above example, may be selected in a relative free manner between 6 dB and 20 dB by determining the various turn numbers.

The described solutions for interconnecting transmitter, receiver and process coupling quite generally are suited for base band radar sensors in monostatic configuration. In particular, they can be used in so-called monopulse TDR sensors for the filling level measurement. These transmit a short pulse, which is not modulated to a carrier frequency, to the filling product and back via a waveguide, and determine the distance from the filling product or the receptacle filling level by means of the transit time. The frequency range mainly used for the measurement signal is below approx. 2 GHz, a reason for which the proposed double hole transformer are perfectly suited for this purpose.

There exist still other well known transformer types, which are suited for this purpose, e.g. a ring-shaped core wound with three filaments. The wide band nature thereof results from the specific kind of winding, which enables a capacitive line coupling between the turn wires at high frequencies.

The embodiments are described above in sufficient detail to enable those skilled in the art to practice the invention.

Other embodiments may be utilized and structural, logical, and electrical changes may be made without departing from the scope of the present invention. The preceding description is, therefore, not to be taken in a limited sense, and the scope of the present invention is defined only by the appended claims, along with the full scope of equivalents to which such claims are entitled.

What is claimed is:

1. A filling level measuring device based on the principle of transit time measurement, comprising
    an electronic unit including a transmitter and a receiver for respectively transmitting and receiving electromagnetic waves having a frequency of below 3 GHz,
    a coupling connected to the electronic unit, which guides transmitted signals onto a measurement distance and receives reflected signals, and
    a high-frequency transformer to which the transmitter, the receiver and the coupling are connected, the high frequency transformer being adapted to at least partially isolate the transmitter from the receiver.

2. The filling level measuring device according to claim 1, wherein the high-frequency transformer is a differential transformer.

3. A filling level measuring device based on the principle of transit time measurement, comprising:
    an electronic unit including a transmitter and a receiver for electromagnetic waves having a frequency of below 3 GHz,
    a coupling connected to the electronic unit, which guides transmitted signals onto a measurement distance, and guides back reflected signals to the electronic unit,
    a high-frequency transformer to which the transmitter, the receiver and the coupling are connected, wherein the high-frequency transformer is a differential transformer, and wherein the differential transformer comprises three windings magnetically coupled with each other, two of which being connected with each other.

4. The filling level measuring device according to claim 3, wherein all of the three windings comprise the same number of turns.

5. The filling level measuring device according to claim 3, wherein two windings comprise the same number of turns, and the third winding has a turn number different therefrom.

6. The filling level measuring device according to claim 5, wherein two windings comprise the same number of turns, and the third winding comprises twice as many turns as one of the two first-mentioned windings.

7. The filling level measuring device according to claim 3, wherein the receiver is connected to a first of the windings, and the transmitter and the coupling are connected to the second and third windings, which are connected with each other.

8. The filling level measuring device according to claim 7, wherein all of the three windings comprise the same number of turns.

9. The filling level measuring device according to claim 7, wherein the third and second windings comprise the same number of turns, and the first winding has a turn number different therefrom.

10. The filling level measuring device according to claim 9, wherein the first winding comprises twice as many turns as one of the second and third windings.

11. The filling level measuring device according to claim 3, wherein the transmitter is connected to a first of the windings, and the receiver and the coupling are connected to the second and third windings, which are connected with each other.

12. The filling level measuring device according to claim 11, wherein all of the three windings comprise the same number of turns.

13. The filling level measuring device according to claim 11, wherein two windings comprise the same number of turns, and the third winding has a turn number different therefrom.

14. The filling level measuring device according to claim 13, wherein two windings comprise the same number of turns, and the third winding comprises twice as many turns as one of the two first-mentioned windings.

15. The filling level measuring device according to claim 3, wherein the coupling is connected to a first of the windings, and the transmitter and the receiver are connected to a second and a third of the windings, which are connected with each other.

16. The filling level measuring device according to claim 15, wherein all of the three windings comprise the same number of turns.

17. The filling level measuring device according to claim 15, wherein the second and third windings comprise the same number of turns, and the first winding has a turn number different therefrom.

18. The filling level measuring device according to claim 17, wherein the first winding comprises twice as many turns as one of the second and third windings.

19. A filling level measuring device based on the principle of transit time measurement, comprising
    an electronic unit including a transmitter and a receiver for electromagnetic waves having a frequency of below 3 GHz,
    a coupling connected to the electronic unit, which guides transmitted signals onto a measurement distance, and guides back reflected signals to the electronic unit, and
    a high-frequency transformer to which the transmitter, the receiver and the coupling are connected, wherein the transmitter and the receiver are connected to a potential electrically isolated from the potential of the coupling.

20. A filling level measuring device based on the principle of transit time measurement, comprising
    an electronic unit including a transmitting and receiving means for electromagnetic waves having a frequency of below 3 GHz,
    a coupling means connected to the electronic unit, which guides the transmitted signals onto the measurement distance, and guides back reflected signals to the electronic unit, and
    a high-frequency transformer configured as a differential transformer, to which the transmitting and receiving means and the coupling means are connected the differential transformer comprising three windings magnetically coupled with each other, two of which are connected with each other, to which the transmitting means and the coupling means are connected, and the receiving means is connected to the third winding.

21. The filling level measuring device according to claim 20, wherein all of the three windings comprise the same number of turns.

22. The filling level measuring device according to claim 20, wherein two windings comprise the same number of turns, and the third winding has a turn number different therefrom.

23. The filling level measuring device according to claim 22, wherein two windings comprise the same number of turns, and the third winding comprises twice as many turns as one of the two first-mentioned windings.

24. A filling level measuring device based on the principle of transit time measurement, comprising
    an electronic unit including a transmitting and receiving means for electromagnetic waves having a frequency of below 3 GHz,
    a coupling means connected to the electronic unit, which guides the transmitted signals onto the measurement distance, and guides back reflected signals to the electronic unit, and
    a high-frequency transformer configured as a differential transformer, to which the transmitting and receiving means and the coupling means are connected the differential transformer comprising three windings magnetically coupled with each other, two of which are connected with each other, to which the receiving means and the coupling means are connected, and the transmitting means is connected to the third winding.

25. The filling level measuring device according to claim 24, wherein all of the three windings comprise the same number of turns.

26. The filling level measuring device according to claim 24, wherein two windings comprise the same number of turns, and the third winding has a turn number different therefrom.

27. The filling level measuring device according to claim 26, wherein two windings comprise the same number of turns, and the third winding comprises twice as many turns as one of the two first-mentioned windings.

28. A filling level measuring device based on the principle of transit time measurement, comprising
    an electronic unit including a transmitting and receiving means for electromagnetic waves having a frequency of below 3 GHz,
    a coupling means connected to the electronic unit, which guides the transmitted signals onto the measurement distance, and guides back reflected signals to the electronic unit, and
    a high-frequency transformer configured as a differential transformer, to which the transmitting and receiving means and the coupling means are connected, the differential transformer comprising three windings magnetically coupled with each other, two of which are connected with each other, to which the receiving means and the transmitting means are connected, and the coupling means is connected to the third winding.

29. The filling level measuring device according to claim 28, wherein all of the three windings comprise the same number of turns.

30. The filling level measuring device according to claim 28, wherein two windings comprise the same number of turns, and the third winding has a turn number different therefrom.

31. The filling level measuring device according to claim 30, wherein two windings comprise the same number of turns, and the third winding comprises twice as many turns as one of the two first-mentioned windings.

32. A filling level measuring device based on the principle of transit time measurement, comprising
    an electronic unit including a transmitting and receiving means for electromagnetic waves having a frequency of below 3 GHz,
    a coupling means connected to the electronic unit, which guides the transmitted signals onto the measurement distance, and guides back reflected signals to the electronic unit, and
    a high-frequency transformer configured as a transformer-directional coupler having four windings and four gates, to which the transmitting and receiving means and the coupling means are connected.

33. The filling level measuring device according to claim 32, wherein the four windings on the same double hole core have different turn numbers.

34. The filling level measuring device according to claim 33, wherein the transmitting means and the receiving means are connected to decoupled gates of the transformer-directional coupler opposite each other, and the process coupling is connected to anyone of the other gates.

35. The filling level measuring device according to claim 34, wherein the transmitting means is connected to a gate 1 of the transformer-directional coupler, the receiving means is connected to a gate 4 of the transformer-directional coupler, and the process coupling is connected to a gate 3 of the transformer-directional coupler.

36. The filling level measuring device according to claim 32, wherein the windings on the same double hole core differ by the factor 2.

37. The filling level measuring device according to claim 36, wherein the transmitting means and the receiving means are connected to decoupled gates of the transformer-directional coupler opposite each other, and the process coupling is connected to any one of the other gates.

38. The filling level measuring device according to claim 37, wherein the transmitting means is connected to a gate 1 of the transformer-directional coupler the receiving means is connected to a gate 4 of the transformer-directional coupler, and the process coupling is connected to a gate 3 of the transformer-directional coupler.

39. The filling level measuring device according to claim 32, wherein the transmitting means and the receiving means are connected to decoupled gates of the transformer-directional coupler opposite each other, and the process coupling is connected to anyone of the other gates.

40. The filling level measuring device according to claim 39, wherein the transmitting means is connected to a gate 1 of the transformer-directional coupler the receiving means is connected to a gate 4 of the transformer-directional coupler, and the process coupling is connected to a gate 3 of the transformer-directional coupler.

41. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer configured as a double hole transformer in SMD technology, to which the transmitting and receiving means and the process coupling are connected.

42. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer in the form of a ring-shaped core with a three-filament winding, to which core the transmitting and receiving means and the coupling means are connected.

43. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer having four gates, to which the transmitting and the receiving means and the coupling means are connected, and which is configured in such a manner that the gate to be fed is isolated from one of the remaining gates.

44. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer having four gates, to which the transmitting and the receiving means and the coupling means are connected, and which is configured in such a manner that the gate to be fed is in a defined manner not completely isolated from all of the other gates.

45. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer configured as a transformer-directional coupler to which the transmitting and receiving means and the coupling means are connected, the transformer-directional coupler comprising a double hole core receiving the four windings, and the turn numbers each being different from each other.

46. The filling level measuring device according to claim 45, wherein the transmitting means and the receiving means are connected to decoupled gates of the transformer-directional coupler opposite each other, and the process coupling is connected to any one of the other gates.

47. The filling level measuring device according to claim 46, wherein the transmitting means is connected to gate 1 of the transformer-directional coupler, the receiving means is connected to gate 4 of the transformer-directional coupler, and the process coupling is connected to gate 3 of the transformer-directional coupler.

48. A filling level measuring device based on the principle of transit time measurement, comprising
   an electronic unit including a transmitting and receiving means for electromagnetic waves having a frequency of below 3 GHz,
   a coupling means connected to the electronic unit, which guides the transmitted signals onto the measurement distance, and guides back reflected signals to the electronic unit, and
   a high-frequency transformer configured as a transformer-directional coupler, to which the transmitting and receiving means and the coupling means are connected, the transformer-directional coupler comprising a double hole core receiving the four windings, and turn numbers of two central windings each being different from two outer windings by the factor 2.

49. The filling level measuring device according to claim 48, wherein the transmitting means and the receiving means are connected to decoupled gates of the transformer-directional coupler opposite each other, and the process coupling is connected to any one of the other gates.

50. The filling level measuring device according to claim 49, wherein the transmitting means is connected to gate 1 of the transformer-directional coupler, the receiving means is connected to gate 4 of the transformer-directional coupler, and the process coupling is connected to gate 3 of the transformer-directional coupler.

51. A method for transmitting and receiving electromagnetic waves having a frequency of below 3 GHz, via a single antenna, wherein guiding transmitted signals of a transmitter into the antenna via a high-frequency transformer, guiding reflected signals received by the antenna to a receiver via the same high-frequency transformer, isolating, at least in part, the receiver from the transmitter via the same high-frequency transformer.

52. The method according to claim 51, wherein guiding reflected signals includes transmitting no usable portion of a transmitted signal transmitted from the transmitter to the receiver via the high-frequency transformer.

53. The method according to claim 51, wherein guiding transmitted signals includes guiding a defined portion of the transmitted signal, for measurement purposes, from the transmitter via the high-frequency transformer directly to the receiver.

54. A monostatic filling level measuring method, comprising:

guiding a transmission signal having a frequency of below 3 GHz through a transformer to an antenna, transmitting the transmission signal from the antenna to create a reflected signal, receiving the reflected signal at the antenna, and guiding the reflected signal through the transformer to a receiver with a defined isolation of the reflected signal from the transmission signal.

55. The method of claim 54, wherein guiding the transmission signal includes transmitting a distance reference portion of the transmission signal to the receiver.

56. A filling level measuring transformer, comprising:

an input adapted to receive a transmission signal;

a measurement input/output circuit adapted to transmit the transmission signal to create a reflected signal;

an output adapted to send the reflected signal to a receiver; and wherein the measurement input/output circuit includes at least three windings adapted to at least partially isolate the input from the output.

* * * * *